United States Patent
Kim et al.

(10) Patent No.: US 7,553,464 B2
(45) Date of Patent: Jun. 30, 2009

(54) LANTHANUM TANTALATE PHOTOCATALYSTS

(75) Inventors: Jin D. Kim, Dae-Jeon (KR); Wei Li, Troy, MI (US); Se H. Oh, Troy, MI (US)

(73) Assignee: General Motors Corporation, Detroit, MI (US)

( * ) Notice: Subject to any disclaimer, the term of this patent is extended or adjusted under 35 U.S.C. 154(b) by 905 days.

(21) Appl. No.: 10/914,362

(22) Filed: Aug. 9, 2004

(65) Prior Publication Data
US 2006/0029536 A1  Feb. 9, 2006

(51) Int. Cl.
*C01F 17/00* (2006.01)
(52) U.S. Cl. .................. 423/263; 502/303; 423/579; 423/658.2
(58) Field of Classification Search ............ 423/579, 423/263, 658.2; 502/303; 210/748; 241/30, 241/184
See application file for complete search history.

(56) References Cited

U.S. PATENT DOCUMENTS 6,685,909 B2   2/2004  Elder et al. .............. 423/598
6,878,666 B2   4/2005  Domen et al. ............ 502/200
2002/0151434 A1 * 10/2002  Domen et al. ............ 502/200
2002/0155948 A1  10/2002  Inoue

OTHER PUBLICATIONS

International Search Report mailed Jun. 27, 2006 for PCT/US05/27284 filed Aug. 1, 2005 corresponding to this application.
Hwang, D. W. et al, "Photocatalytic Water Splitting Over Highly Donor-Doped (110) Layered Perovskites," Journal of Catalysis 193, 40-48 (2000).
Kudo, A. et al., "Water Splitting into H2 and O2 on New Sr2M2O7 (M=Nb and Ta) Photocatalysts with Layered Perovskite Structures: Factors Affecting the Photocatalytic Activity," J. Phys. Chem. B 2000, 104, 571-575.
Machida, M. et al., "Photocatalytic Property and Electronic Structure of Lanthanide Tantalates, LnTaO4n (Ln=La, Ce, Pr, Nd, and Sm)," J. Phys. Chem. B 2001, 105, 3289-3294.

* cited by examiner

*Primary Examiner*—Steven Bos

(57) ABSTRACT

A substantially pure phase $LaTaO_4$ photocatalyst is prepared by grinding precursors with mixture of at least two different sizes of high-density yttrium-stabilized zirconia balls to a very fine particle size and calcining the ground precursors. The $LaTaO_4$ photocatalyst prepared by this method is useful in photolysis of water.

25 Claims, 4 Drawing Sheets

LANTHANUM TANTALATE PHOTOCATALYSTS

FIELD OF THE INVENTION

The present invention relates generally to photocatalysts for water splitting, methods of preparing photocatalytically effective compounds, and methods involving photocatalytic reactions.

BACKGROUND OF THE INVENTION

Photocatalytic water splitting has been studied as a way to harness solar energy by using it to generate clean, high energy-containing hydrogen from water, an abundant, inexpensive feedstock. Efforts have been directed toward producing compounds with higher catalytic activity in the photolysis of water. Catalytic activity of the titanium dioxide-based photocatalysts originally studied was improved with catalysts such as $Pt/TiO_2$ and $RuO_2/TiO_2$. Strontium-titanium oxide-based materials such as a reduced $SrTiO_3$/platinum electrode pair, $SrTiO_3$ powder modified with rhodium oxide, platinized $SrTiO_3$, and nickel-loaded $SrTiO_3$ have been studied, but the amount of absorbed photons used in the photolysis for these photocatalysts (the "quantum yield") is less than 1%. More recently, quantum yields of 5-10% have been obtained with layered structures of $K_4Nb_6O_{17}$, $K_4Ta_xNb_{6-x}O_{17}$, and $Rb_4Ta_xNb_{6-x}O_{17}$, and quantum yields as high as 30% have been obtained with $K_2La_2Ti_3O_{10}$ prepared in a polymerized complex method. The materials with improved quantum yield have interlayer reaction sites that can physically separate electron and hole pairs created by photoabsorption to retard electron-hole recombination. Even higher photocatalytic activity of the complex oxides would be desirable, however.

One reference concerning photocatalytic properties and electronic structure of lanthanide tantalates, teaches preparing lanthanide tantalates by calcining powder mixtures of lanthanum oxides with tantalum oxide at 1200° C. (1473K) for 10 hours in air. The as-prepared calcined powder precursor is impregnated with aqueous nickel nitrate and submitted to reduction in hydrogen at 500° C., then oxidation in oxygen at 200° C. to provide a nickel-loaded catalyst with partially oxidized nickel. The authors reported a photocatalytic activity of $LaTaO_4$ loaded with 0.7 wt % of Ni using 200 cc water and 0.2 g catalyst of 115.6 μmol hydrogen/hr. and 51.5 μmol oxygen/hr.

It is desirable to have the catalytic activity as high as possible to capture more energy-rich hydrogen fuel. Thus, a need remains increasing the catalytic activity of photocatalytically active materials.

SUMMARY OF THE INVENTION

An improved grinding method for preparing $LaTaO_4$ material with a high activity as a photocatalyst for water splitting has steps of grinding a lanthanum compound and a tantalum compound with a combination of high density yttrium-stabilized zirconia (YSZ) balls (specific density of about 5.5 to about 6.5 g/cc) of different sizes, and then calcining together the ground compounds.

In a further embodiment of the invention, the grinding step is carried out on a slurry of precursor compounds in water and/or a lower alcohol. The slurry preferably further includes an amount of a protonic acid, which maybe either an inorganic or an organic acid.

In still a further embodiment of the invention, a $LaTaO_4$ material is ground as an aqueous or alcoholic slurry with a mixture of at least two different sizes high density yttrium-stabilized zirconia (YSZ) grinding media in a ball mill, separated from the YSZ grinding beads, dried, and calcined at about 1023 K to about 1223 K, preferably at about 1073 K to about 1173 K. The calcined product may then be loaded by an incipient wetness impregnation method with an appropriate co-catalyst metal, such a nickel, to form a two-layer ($NiO/LaTaO_4$) or three-layer ($NiO/Ni/LaTaO_4$) catalyst structure, depending on the redox conditions used to treat the catalyst.

In still a further embodiment of the invention, a $LaTaO_4$ material is ground as an aqueous or alcoholic slurry with a mixture of at least two different sizes of high density yttrium-stabilized zirconia (YSZ) beads in a ball mill, separated from the YSZ beads, dried, and calcined at about 1023 K to about 1223 K, preferably at about 1073 K to about 1173 K. The calcined product may then be doped by compounds containing elements such as strontium and following calcination at about 1023 K to about 1223 K, preferably at about 1073 K to about 1173 K to form $Sr/LaTaO_4$. The doped product is then loaded by an incipient wetness impregnation method with an appropriate co-catalyst metal, such a nickel, to form a two-layer ($NiO/LaTaO_4$) or three-layer ($NiO/Ni/LaTaO_4$) catalyst structure, depending on the redox conditions used to treat the catalyst.

In one embodiment, a pure phase $LaTaO_4$ material is synthesized by calcining at a temperature between about 1073 K to about 1173 K, and particularly at about 1123 K, a mixture of a lanthanum precursor and a tantalum precursor prepared by milling with the mixture of at least two different sizes of high-density YSZ balls. The product has a smaller particle size, greater surface area, substantially a single crystalline phase, and higher photocatalytic activity compared to lanthanum tantalate catalysts produced by conventional grinding.

In another embodiment, $LaTaO_4$ photocatalysts for water splitting with increased activity are prepared by a method including a step of milling with a mixture of at least two different sizes of high density YSZ balls. The photocatalysts are used in a process of photolysis of water to generate hydrogen and oxygen. The $LaTaO_4$ photocatalysts may be doped with a variety of cations after calcination including nickel, strontium, potassium, barium, and other alkali metals, alkaline earth metals, and transition metals.

In a further embodiment, $LaTaO_4$ photocatalysts for water splitting with increased activity are produced by a method including a step of milling a mixture of lanthanum and tantalum precursors with a mixture of YSZ balls, wherein the mixture is of YSZ balls having an average diameter of about 10 mm and YSZ balls of at least one smaller size having an average diameter of about 5 mm or less. The milled mixture is then calcined under conditions appropriate to produce a substantially pure phase $LaTaO_4$ material. The $LaTaO_4$ photocatalysts may optionally be doped with a cation, particularly with strontium, after calcination and can be used in a process of photolysis of water to generate hydrogen and oxygen.

The invention further provides a $Sr/LaTaO_4$ material having a photocatalytic activity for water splitting of at least about 3000 micromoles hydrogen per gram catalyst per hour. Photocatalytic water splitting activity may be measured at room temperature by placing a high pressure Hg lamp (Ace Glass Inc., 450 W) an inner irradiation-type 500 ml quartz reaction cell. The catalyst (0.3 g) is suspended in distilled water (500 ml) by magnetic stirring. The rates of $H_2$ and $O_2$ evolution may be analyzed by a gas chromatograph (using a thermal conductivity detector, molecular sieve 5A column, and argon carrier gas).

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
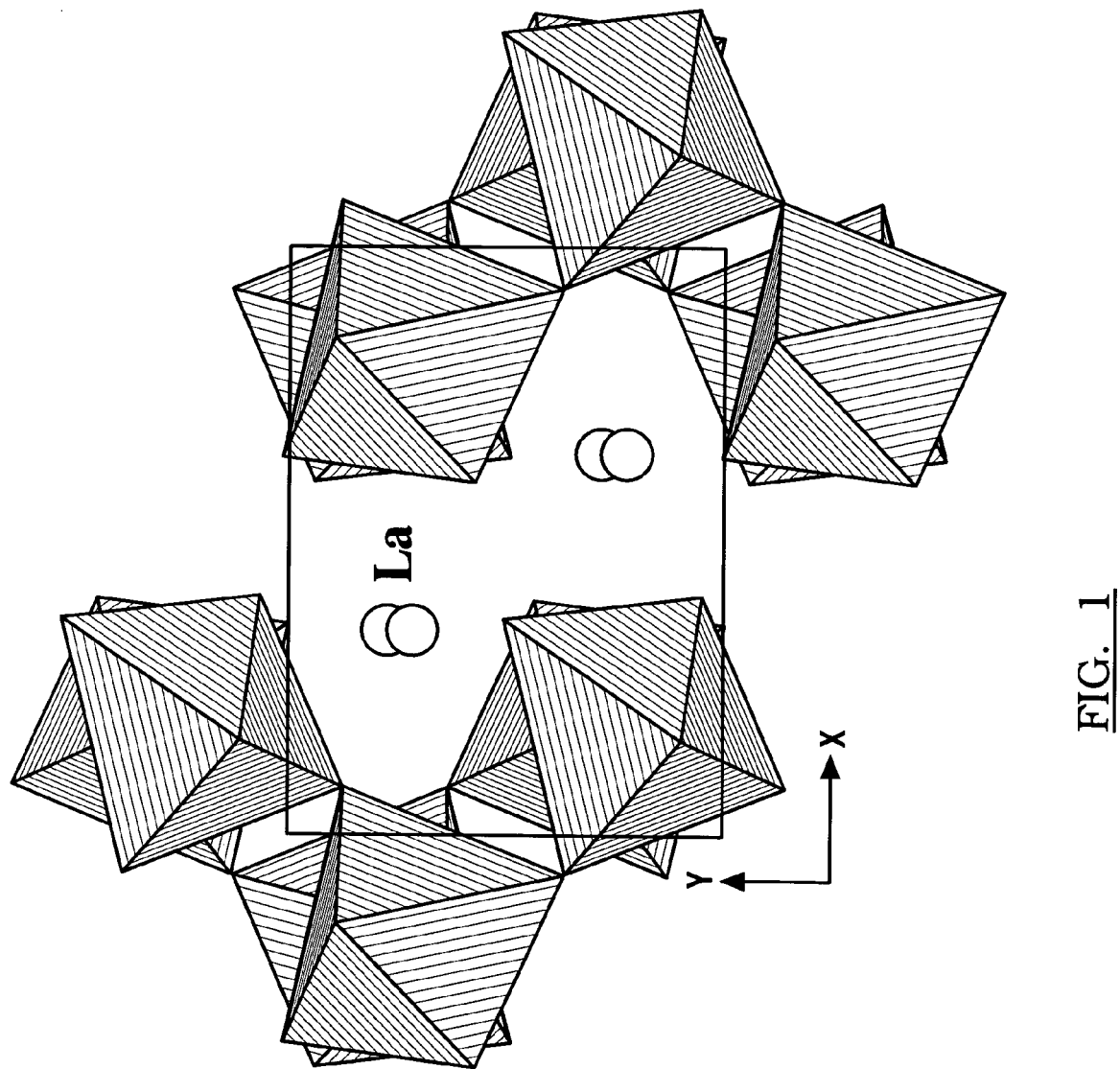
FIG. 1 is a projection of the $LaTaO_4$ crystal structure in the XY plane.

The following description of the preferred embodiment(s) is merely exemplary in nature and is in no way intended to limit the invention, its application, or uses.

A grinding method for preparing $LaTaO_4$ of high photocatalytic activity has a step of grinding the material with a mixture of at least two different sizes of high-density yttrium-stabilized zirconia (YSZ) balls. Ball milling with a mixture of at least two different sizes of high-density YSZ beads is an efficient way to finely grind the mixture of precursor compounds for making the $LaTaO_4$. The milled precursors are then calcined at an appropriate temperature to produce the $LaTaO_4$ catalyst material.

In one embodiment, the mixture of at least two different sizes of high density YSZ beads includes at least two sizes of YSZ beads having a ratio of diameters of from about 1.5:1 to about 5:1, more preferably from about 1.5:1 to about 2.5:1.

In another embodiment, the mixture of at least two different sizes of high density YSZ beads includes at least three sizes of YSZ beads, in which the ratio of diameters of at least two of the sizes is from about 1.5:1 to about 5:1, more preferably from about 1.5:1 to about 2.5:1. In particular, the mixture of at least two different sizes of high density YSZ beads may include a first bead size of diameter from about 8 mm to about 12 mm, a second bead size of from about 2 mm to about 6 mm, and, optionally, a third bead size from about one-half to about one-fifth the diameter of the second bead. Bead diameters refer to nominal dimensions. A larger bead is included to provide sufficient force for efficient grinding of the precursor compounds, while the smaller sizes or sizes are included to provide a more compact grinding media with greater surface area.

Suitable examples of precursor compounds for preparing the $LaTaO_4$ catalysts include, without limitation, lanthanum carbonate and lanthanum oxide, tantalum oxide, and tantalum carbonate.

The precursor compounds may be mixed and ground or ground separately and then mixed together before calcinations. The precursor compounds are slurried in water and/or liquid alcohol for grinding. Examples of suitable liquids for slurrying the solids to be ground include, without limitation, water, ethanol isopropanol, n-propanol, isobutanol, n-butanol, tert-butanol, ethylene glycol, diethylene glycol, ethylene, and propylene glycol monoalkyl ethers such as propylene glycol monomethyl ether, cyclohexanol, glycerol, lower molecular weight polyethylene glycols, sec-butanol, and combinations of these. Methanol, while effective, is not preferred because it is too volatile and produces hazardous vapors.

An inorganic or organic protonic acid is added to the slurry before grinding. Examples of suitable protonic acids that may be used include, without limitation, hydrochloric acid, sulfuric acid, nitric acid, boric acid, phosphoric acid, propionic acid, trifluoracetic acid, acetic acid, lactic acid, oxalic acid, phosphonic acid, sulfonic acids, for example methanesulfonic acid, ethanesulfonic acid, p-toluenesulfonic acid, and dodecylbenzenesulfonic acid, citric acid, maleic acid, butyric acid, glycolic acid, phytic acid, formic acid, benzoic acid, acrylic acid, methacrylic acid, and combinations of these. Particularly preferred are nitric acid and acetic acid.

The optimal amount of protonic acid may vary depending on the particular acid selected, but in general the acid may be included in amounts of about 0.1% to about 5% of the liquid volume, especially in amounts of about 0.5% to about 2% of the liquid volume.

The precursor compounds are then ground with the mixture of at least two different sizes of high density YSZ balls until a desired particle size is obtained. The precursor compounds can be ground to sub-micron size particles with the mixture of at least two different sizes of high-density YSZ balls. The smaller particle size precursor compounds can be calcined under milder conditions (lower temperature, shorter duration) to provide $LaTaO_4$ of substantially a single phase, greater surface area, and higher photocatalytic activities for water splitting.

After grinding, the ground precursor compounds are separated from the grinding media and dried. For example, precursor compounds may be dried in a forced-air or stagnant-air oven at temperatures above the boiling point of the liquid in which they are slurried.

When dry, the mixture of ground precursor compounds is calcined at a temperature of 1023 K to about 1223 K, preferably at about 1073 K to about 1173 K. $LaTaO_4$ synthesized using our grinding method before calcination shows aggregates of particles smaller than 0.2 microns for the solid-state reactions within the range of about 1073 K to about 1173 K. $LaTaO_4$ samples with a pure crystal phase were prepared with calcination in this temperature range using precursors prepared by the chemical-assisted ball mill grinding with the mixture of at least two different sizes of high-density YSZ balls. FIG. 1 is a projection of the $LaTaO_4$ crystal structure in the XY plane. The optimum calcinations temperature for preparing the $LaTaO_4$ using the precursors ground by our method is about 1123. Calcination temperatures higher than the optimum range produce increasing amounts of other crystal phases of lanthanum tantalite, $LaTa_3O_9$ and $LaTa_7O_{19}$.

The mixed phase lanthanum tantalates have lower photocatalytic activity, as the $LaTa_3O_9$ and $LaTa_7O_{19}$ crystal phases have lower activity than $LaTaO_4$.

Incipient wetness impregnation is a well-known method of loading active components by adding a solution of a soluble metal salt to the crystalline product powder until the powder reaches incipient wetness. Suitable examples of activating salts include, without limitation, nickel nitrate, nickel acetate, and $H_2PtCl_6$. After impregnation, the powder is dried and then calcined in air. Depending on the desired state of the added metal, the powder may also be subjected to reducing conditions (heat, hydrogen) for a desired time.

Figure 2:
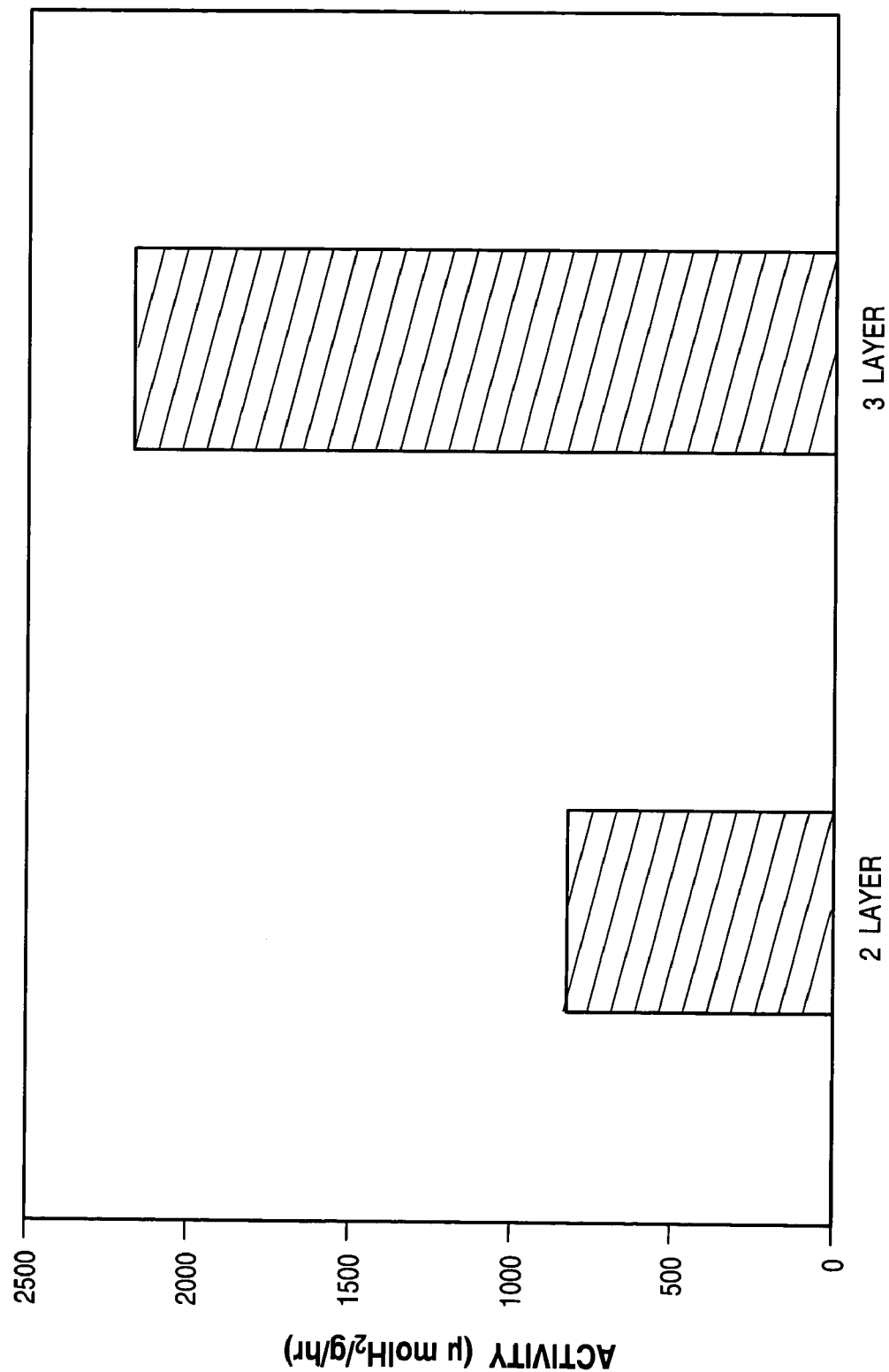
FIG. 2 is a bar graph comparing the photocatalytic activity in water splitting (measured as micromoles of hydrogen generated per gram catalyst per hour) of the 2-layer nickel loaded catalyst ($NiO/LaTaO_4$) to the 3-layer nickel loaded catalyst ($NiO/Ni/LaTaO_4$)

Nickel is a particularly effective co-catalyst. Optimal nickel loading of the $LaTaO_4$ catalyst of the invention was determined by testing activity of the catalyst loaded with 0.1 wt % to 4.0 wt. % nickel loading. The optimum amount was about 2.3 wt. % Ni loading (for the NiO/Ni/perovskite-type catalyst). The calcined samples were converted to the active photocatalysts (NiO/Ni/perovskite) by loading the perovskite material with 0.1-4 wt. % of Ni metal using aqueous nickel nitrate solution in incipient-wetness impregnation technique. The impregnated perovskite was dried and then calcined in air to provide a $NiO/LaTaO_4$ material. The nickel-loaded material was then reduced by hydrogen at 773K for 2 hours and oxidized by air at 473 K for one hour to provide the $NiO/Ni/LaTaO_4$ catalyst. FIG. 2 is a bar graph comparing the photocatalytic activity of the 2-layer nickel loaded catalyst $NiO/LaTaO_4$ with the photocatalytic activity of the 3-layer nickel loaded catalyst $NiO/Ni/LaTaO_4$.

The $LaTaO_4$ catalyst can be doped with other cations. Examples of suitable alkali, alkaline earth and rare earth elements that may be doped into the $LaTaO_4$ material include, without limitation, Na, K, Ca, Sr, Ba, Ni, La, Cr, Zn, Ga, Ge, In, and Sn.

Figure 3:
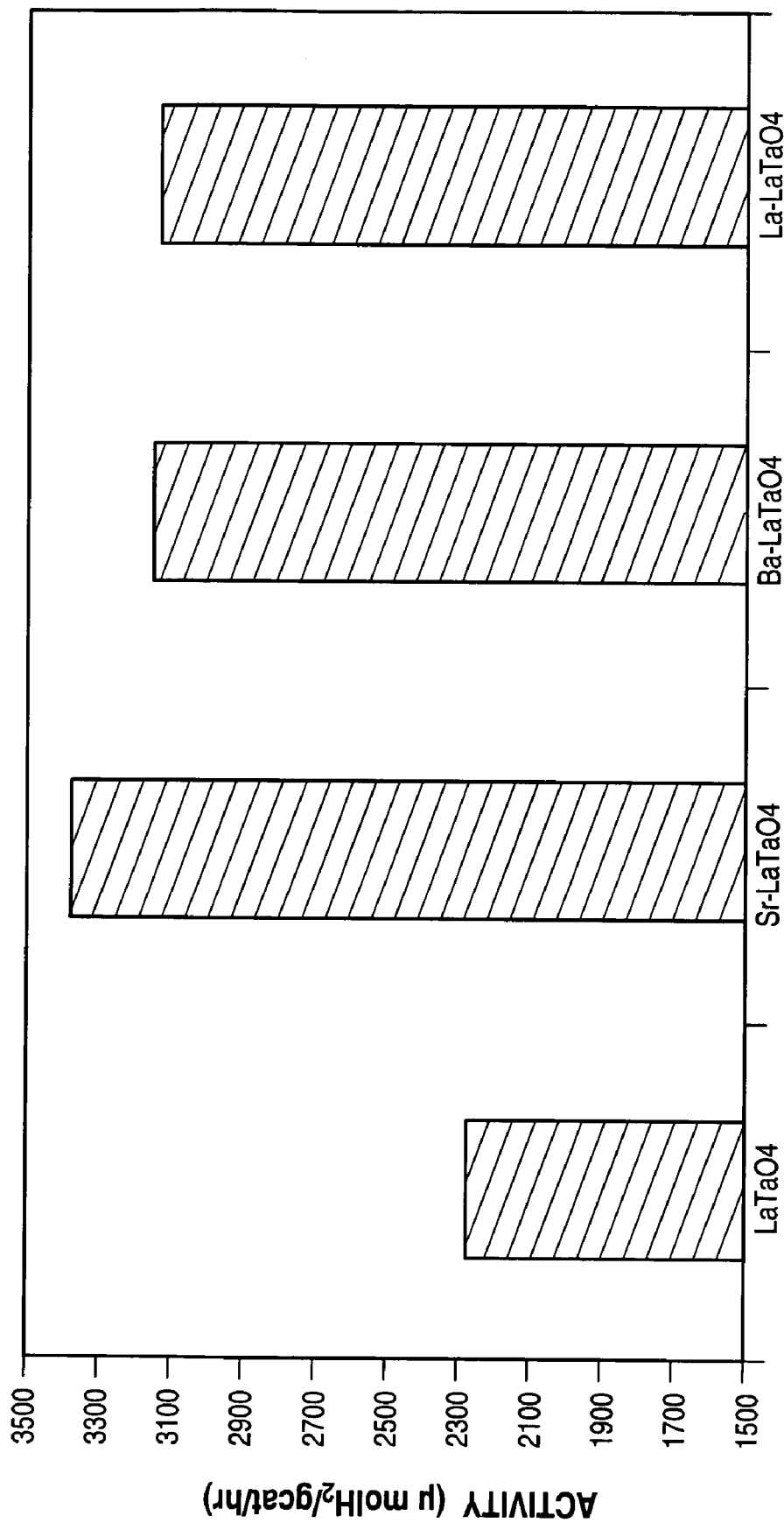
FIG. 3 is a bar graph comparing the photocatalytic activity in water splitting (measured as micromoles of hydrogen generated per gram catalyst per hour) of the $LaTaO_4$ catalyst without doping to the $LaTaO_4$ catalyst doped with 1.5 wt. % strontium, barium, and lanthanum.

In particular, doping with Strontium enhances the photocatalytic activity of $LaTaO_4$ prepared by our method. Sr-doped $LaTaO_4$ has particularly high activity, with $H_2$ production rate of 3300 micromoles per gram catalyst per hour. This is one of the best catalysts ever reported under UV irradiation. Optimal strontium loading of the $LaTaO_4$ catalyst of the invention was determined by testing activity of the catalyst loaded with 0.5 wt % to 2.5 wt. % nickel loading. The optimum amount was about 1.5 wt. % Sr loading, which provided an activity of about 3300 micromoles hydrogen generated per gram catalyst per hour. FIG. 3 is a bar graph comparing the photocatalytic activities in water splitting (measured as micromoles of hydrogen generated per gram catalyst per hour) of the $LaTaO_4$ catalyst without doping to the $LaTaO_4$ catalyst doped with 1.5 wt. % strontium, barium, and lanthanum. The $LaTaO_4$ was prepared by calcining the precursors for 10 hours at 1123 K. The doping was carried out for 10 hours at 1123 K. Finally, each material was loaded with nickel, then oxidized and reduced to provide a three-layer structure Ni/NiO/perovskite.

The doping sequence is important, as doping after formation by grinding and calcination of the $LaTaO_4$ crystal phase (a "two-step" doping) results in more photocatalytic activity compared to adding the dopant to the precursors during the initial grinding and formation of $LaTaO_4$ by calcination (a "one-step" doping). Thus, the doping is preferably carried out on the $LaTaO_4$ material itself.

SEM and x-ray diffraction of the catalysts of the invention show increased crystallinity and increased surface areas. A photocatalyst prepared by the method of the invention may be used for photocatalytic splitting of water. The process of water splitting may include exposing the water to actinic radiation in the presence of the photocatalyst prepared by the method of the invention. Catalytic activity is increased compared to catalysts produced by previous methods.

The invention is further described in the following example. The example is merely illustrative and does not in any way limit the scope of the invention as described and claimed. All parts are parts by weight unless otherwise noted.

EXAMPLE 1

Photocatalyst of the Invention 3.662 grams $La_2O_3$ and 2.700 grams $Ta_2O_5$ were thoroughly mixed in a 50-ml glass bottle. Then, 30 ml isopropanol was added to the mixture, and the mixture was ground for 20 hours using high-density YSZ grinding media in a ball mill. The YSZ balls were separated from the ground precursor slurry, and the precursor slurry was dried in an oven at 423 K. The dried powders were calcined at 1173 K for 10 hours in static air. The calcined product was then loaded with 0.5 wt. % Ni metal by the incipient wetness impregnation method using $Ni(NO_3)_2 \cdot 6H_2O$ to obtain NiO/Ni/perovskite. The impregnated material was dried in an oven at 373 K and calcined at 573 K in air for 1 hour.

The activity of the catalyst of Example 1 was determined to be 3250 μmol $H_2$ per gram catalyst per hour and 1625 μmol $O_2$ per gram catalyst per hour.

COMPARATIVE EXAMPLE A

Photocatalyst Prepared by Conventional Method 3.662 grams $La_2O_3$ and 2.700 grams $Ta_2O_5$ were thoroughly mixed in a 50-ml glass bottle. Then, 30 ml isopropanol was added to the mixture, and the mixture was ground for 20 hours using conventional ball milling with YSZ balls of a single size (5 mm). The YSZ balls were separated from the ground precursor slurry, and the precursor slurry was dried in an oven at 423 K. The dried powders were calcined at 1173 K for 10 hours in static air. The calcined product was then loaded with 0.5 wt. % Ni metal by the incipient wetness impregnation method using $Ni(NO_3)_2 \cdot 6H_2O$ to obtain NiO/Ni/perovskite. The impregnated material was dried in an oven at 373 K and calcined at 573 K in air for 1 hour.

Figure 4:
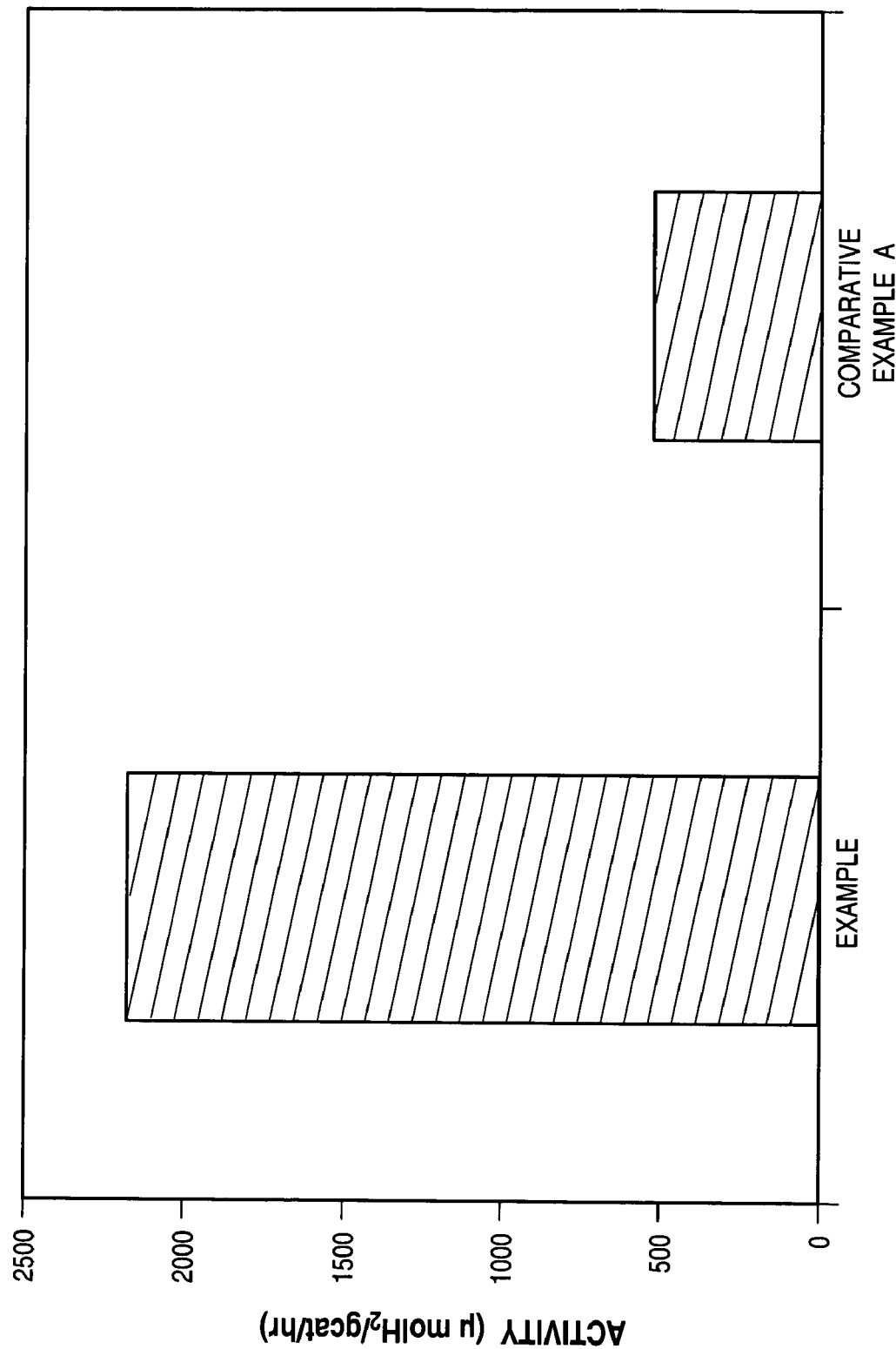
FIG. 4 is a bar graph comparing the photocatalytic activity in water splitting (measured as micromoles of hydrogen generated per gram catalyst per hour) of $NiO/Ni/LaTaO_4$ prepared in Example 1 to the photocatalytic activity of $NiO/Ni/LaTaO_4$ prepared in Comparative Example A.

The activity of the catalyst of Comparative Example A was determined to be 465 μmol $H_2$ per gram catalyst per hour and 230 μmol $O_2$ per gram catalyst per hour. FIG. 4 is a bar graph comparing the photocatalytic activity in water splitting (measured as micromoles of hydrogen generated per gram catalyst per hour) of $NiO/Ni/LaTaO_4$ prepared in Example 1 to the photocatalytic activity of $NiO/Ni/LaTaO_4$ prepared in Comparative Example A The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of preparing a lanthanum tantalum material, comprising steps of
grinding a lanthanum compound and a tantalum compound with a mixture of at least two different sizes of high density yttrium-stabilized zirconia balls and
then calcining together the ground compounds to produce the lanthanum tantalum material, wherein the lanthanum tantalum material comprises a substantially pure phase $LaTaO_4$.

2. A method according to claim 1, wherein the mixture of at least two different sizes of high-density yttrium-stabilized zirconia balls comprises at least two sizes of yttrium-stabilized zirconia balls having a ratio of diameters of from about 1.5:1 to about 5:1.

3. A method according to claim 1, wherein the mixture of at least two different sizes of high-density yttrium-stabilized zirconia balls comprises at least two sizes of yttrium-stabilized zirconia balls having a ratio of diameters of from about 1.5:1 to about 2.5:1.

4. A method according to claim 1, wherein the mixture of at least two different sizes of high-density yttrium-stabilized zirconia balls comprises at least three sizes of zirconia balls.

5. A method according to claim 1, wherein the mixture of at least two different sizes of high-density yttrium-stabilized zirconia balls comprises at least three sizes of yttrium-stabilized zirconia balls, in which the ratio of diameters of at least two of the sizes is from about 1.5:1 to about 2.5:1.

6. A method according to claim 1, wherein the mixture of at least two different sizes of high-density yttrium-stabilized zirconia balls comprises at least a fraction of yttrium-stabilized zirconia balls having a first bead size with diameter of from about 8 mm to about 12 mm.

7. A method according to claim 6, wherein the mixture of at least two different sizes of high-density yttrium-stabilized zirconia balls comprises at least a fraction of yttrium-stabilized zirconia balls having a second bead size with diameter of from about 2 mm to about 6 mm.

8. A method according to claim 7, wherein the mixture of at least two different sizes of high-density yttrium-stabilized zirconia balls comprises at least a fraction of yttrium-stabilized zirconia balls having a third bead size of from about one-half to about one-fifth the diameter of the second bead size.

9. A method according to claim 1, wherein the grinding step is carried out on a slurry of the compounds in a liquid selected from the group consisting of water and alcohols.

10. A method according to claim 1, wherein the grinding step is carried out on a slurry of the compounds in a liquid selected from the group consisting of water, ethanol isopropanol, n-propanol, isobutanol, n-butanol, tert-butanol, ethylene glycol, diethylene glycol, an ethylene glycol monoalkyl ether, a propylene glycol monoalkyl ether, cyclohexanol, glycerol, lower molecular weight polyethylene glycols, sec-butanol, and combinations thereof.

11. A method according to claim 9, wherein the step of grinding a mixture of precursor compounds is carried out in the presence of a protonic acid material.

12. A method according to claim 11, wherein the protonic acid material comprises a member selected from the group consisting of hydrochloric acid, sulfuric acid, nitric acid, boric acid, phosphoric acid, propionic acid, trifluoracetic acid, acetic acid, lactic acid, oxalic acid, phosphonic acid, methanesulfonic acid, ethanesulfonic acid, p-toluenesulfonic acid, dodecylbenzenesulfonic acid, citric acid, maleic acid, butyric acid, glycolic acid, phytic acid, formic acid, benzoic acid, acrylic acid, methacrylic acid, and combinations thereof.

13. A method according to claim 11, wherein the protonic acid material comprises a member selected from the group consisting of nitric acid, acetic acid, and combinations thereof.

14. A method according to claim 11, wherein the protonic acid material is included in an amount of about 0.1% to about 5% by volume liquid.

15. A method according to claim 1, wherein the step of calcining together the ground compounds is carried out at a temperature in the range of about 1023 K to about 1223 K.

16. A method according to claim 1, wherein the step of calcining together the ground compounds is carried out at a temperature in the range of about 1073 K to about 1173 K.

17. A method according to claim 1, comprising a further step of adding a co-catalyst metal to the lanthanum tantalum material.

18. A method according to claim 17, wherein the step of adding a co-catalyst is carried out by incipient wetness impregnation of the calcined lanthanum tantalum material with a soluble salt of the co-catalyst metal followed by calcining the impregnated material.

19. A method according to claim 18, wherein the co-catalyst metal is a member selected from the group consisting of nickel, strontium, lanthanum, potassium, and barium.

20. A method according to claim 18, wherein the co-catalyst metal is a member selected from the group consisting of alkali metals, alkaline earth metals, and transition metals.

21. A photocatalyst prepared according to the method of claim 18, wherein the photocatalyst is a $Sr/LaTaO_4$ having a photocatalytic activity for water splitting of at least about 3000 micromoles hydrogen per gram catalyst per hour.

22. A process of water splitting, comprising a step of exposing the water to actinic radiation in the presence of a photocatalyst prepared according to the method of claim 1.

23. A process of water splitting, comprising a step of exposing the water to actinic radiation in the presence of a photocatalyst prepared according to the method of claim 11.

24. A process of water splitting, comprising a step of exposing the water to actinic radiation in the presence of a photocatalyst prepared according to the method of claim 16.

25. A process of water splitting, comprising a step of exposing the water to actinic radiation in the presence of a photocatalyst prepared according to the method of claim 19.

* * * * *